(12) United States Patent
Wang Helmersson et al.

(10) Patent No.: US 8,725,079 B2
(45) Date of Patent: May 13, 2014

(54) SYSTEM AND METHOD FOR DETERMINING THE SEVERITY OF INTERFERENCE IN DIFFERENT AREAS OF A CELLULAR RADIO NETWORK AND COORDINATING RADIO RESOURCE MANAGEMENT FEATURES IN RESPONSE

(75) Inventors: Ke Wang Helmersson, Linköping (SE); Martin Hessler, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 290 days.

(21) Appl. No.: 13/231,582

(22) Filed: Sep. 13, 2011

(65) Prior Publication Data

US 2012/0315935 A1 Dec. 13, 2012

Related U.S. Application Data

(60) Provisional application No. 61/494,177, filed on Jun. 7, 2011.

(51) Int. Cl.
*H04B 1/00* (2006.01)
*H04W 16/14* (2009.01)
*H04W 28/04* (2009.01)
*H04B 1/10* (2006.01)

(52) U.S. Cl.
CPC .............. *H04W 16/14* (2013.01); *H04W 28/04* (2013.01); *H04B 1/1027* (2013.01)
USPC ........ 455/63.1; 455/501; 455/67.13; 455/524

(58) Field of Classification Search
USPC ............ 455/17, 226.3, 39, 422.1, 561, 562.1, 455/423, 424, 436, 442, 447, 450, 522, 455/452.1, 453, 501, 524, 62, 63.1, 67.13, 455/67.11, 69, 101, 9; 370/210, 261, 242, 370/252, 280, 310, 260, 312, 315, 320, 370/328–330, 332, 335, 338, 339, 389, 465, 370/479; 375/141, 146, 148, 260, 267, 285
See application file for complete search history.

(56) References Cited

U.S. PATENT DOCUMENTS

2003/0181211 A1* 9/2003 Razavilar et al. ............. 455/450
2004/0127191 A1* 7/2004 Matsunaga ................... 455/403

(Continued)

OTHER PUBLICATIONS

Heyman. Intercell Interference Management in an OFDM-Based Downlink. Linkoping University. Jun. 12, 2006.

(Continued)

*Primary Examiner* — Edward Urban
*Assistant Examiner* — Golam Sorowar

(57) ABSTRACT

An interference analysis tool for identifying an interference problem area in a cellular radio network in which at least a first User Equipment (UE1) and a second UE (UE2) operate. The tool receives signal quality measurements and determines uplink or downlink interference severity. For UE2 uplink interference, the tool determines a first uplink Signal-to-Interference-and-Noise-Ratio (SINR) experienced by UE2, wherein the first SINR includes uplink interference from UE1. The tool also determines a second uplink SINR level ($SINR_0$) experienced by UE2, wherein $SINR_0$ does not include the uplink interference from UE1. The tool calculates a difference ($\Delta SINR$) between SINR and $SINR_0$ for UE2, and identifies the area where UE1 is operating as an interference-causing area when the $\Delta SINR$ for UE2 is greater than a threshold value. The tool may present interference severity levels to an operator, and may initiate Radio Resource Management (RRM) procedures to mitigate interference problems in the network.

28 Claims, 8 Drawing Sheets

(56) References Cited

U.S. PATENT DOCUMENTS

2007/0280170 A1* 12/2007 Kawasaki ............... 370/331
2008/0096568 A1*  4/2008 Jeong .................... 455/441
2010/0128627 A1*  5/2010 Fujita et al. ............ 370/252
2010/0309861 A1* 12/2010 Gorokhov et al. ...... 370/329
2011/0306347 A1* 12/2011 Choi et al. .............. 455/438

OTHER PUBLICATIONS

Fodor, et al. Intercell Interference Coordination in OFDMA Networks in the 3GPP Long Term Evolution Systems. 3GPP Long Term Evolution Systems, Journal of Communications; vol. 4 No. 7. Aug. 2009.

Triki, et al. Intercell Interference Coordination Algorithms in OFDMA Wireless Systems. Vehicular Technology Conference (VTC Spring), 2011 IEEE $73^{rd}$. May 15, 2011.

You, et al. Intercell Interference Coordination Using Threshold-Based Region Decisions. Wireless Personal Communications; Kluwer Academic Publishers; col. 59, No. 4. Mar. 5, 2011.

* cited by examiner

SYSTEM AND METHOD FOR DETERMINING THE SEVERITY OF INTERFERENCE IN DIFFERENT AREAS OF A CELLULAR RADIO NETWORK AND COORDINATING RADIO RESOURCE MANAGEMENT FEATURES IN RESPONSE

CROSS-REFERENCE TO RELATED APPLICATIONS

This application claims the benefit of U.S. Provisional Patent Application No. 61/494,177 filed Jun. 7, 2011, the disclosure of which is fully incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to cellular telecommunication systems. More particularly, and not by way of limitation, particular embodiments of the present invention are directed to an apparatus and method for determining the severity of interference in different areas of a cellular radio network and for coordinating Radio Resource Management (RRM) features in response.

Inter-cell interference (ICI) is one of the most dominant sources for performance impairment in a wireless cellular network. To alleviate the impact on the performance impairment, the 3rd Generation Partnership Project (3GPP) has specified in 3GPP Technical Specification 36.331, signaling over an X2 interface between the eNodeBs (eNBs) to exchange load information. Various inter-cell interference coordination (ICIC) solutions for multi-cell wireless systems have also been proposed, as described in G. Fodor et al, "Intercell Interference Coordination in OFDMA Networks and in the 3GPP Long Term Evolution Systems", Journal of Communications, Vol. 4, No. 7, August 2009.

The ICI problem in a one-reuse system, such as the Long Term Evolution (LTE) radio access network, can be illustrated in a simplified example. Two serving cells, cell A and Cell B, operating in a frequency band, allocate a number of Physical Resource Blocks (PRBs), or subbands, to their users. Users who are allocated to transmit at the same time and in the same subbands will interfere with each other, causing a conflict or collision. A collision may cause a lower Signal-to-Interference-and-Noise-Ratio (SINR) and Hybrid Automatic Repeat Request (HARQ) retransmission may needed to decode the transmitted bits. The retransmissions reduce the user throughput.

The load indication procedure for ICIC, as specified in 3GPP TS 36.331, includes two load indicators:

Uplink Interference Overload Indicator (UL IOI). The UL IOI indicates the interference level experienced by the indicated cell on all resource blocks. The message is enumerated per PRB with high, medium, or low interference.

UL High Interference Indicator (UL HII). The UL HII indicates the occurrence of high interference sensitivity, as seen from the sending eNB. The message is a bit map of high or low interference per PRB.

In a simple example, a UL IOI and a UL HII may be transmitted from Cell A to Cell B. In an example scenario, the UL IOI may indicate High (interference) on PRBs in the upper third of the frequency bandwidth while indicating Low (interference) on the remaining two-thirds of the PRBs. Having received the UL IOI message, the receiving cell, Cell B in this example, may take the UL IOI into account and select cell-center User Equipments (UEs) to be scheduled on highly interfered PRBs to reduce interference to the indicated cell.

Likewise, Cell A may transmit a UL HII indicator to Cell B. The UL HII may indicate High (interference) on PRBs in the lower two-thirds of the frequency bandwidth while indicating Low (interference) on the remaining third of the PRBs. Having received the UL HII message, the receiving cell may take the UL HII into account and avoid scheduling cell-edge UEs on the concerned PRBs.

Besides the load information messages transferred between eNBs for coordinating the interference between neighboring cells, there are also messages and processes specified between each UE and neighboring cells to request and report Reference Signal Received Power (RSRP) measurements.

LTE, as well as High Speed Packet Access (HSPA) networks, are designed for a frequency reuse of one, which means that every base station uses the entire system bandwidth for transmission and there is no frequency planning among cells to cope with interference from neighboring cells. In homogeneous networks with uniformly distributed macro base stations, the inter-cell interference is mostly likely to occur at the boundaries of the cells. The traditional approach to identify the interference area is to divide cells into cell-center and cell-edge portions based on path loss and geometry measurements. However, real networks are not always homogeneous. Areas with interference problems depend on how macro base stations are deployed in each operator's network. Furthermore, the problem is complicated by the recent evolution of a multi-layer heterogeneous network (HetNet), where a layer of high-power macro base stations is overlaid with layers of lower powered pico or micro cells. There are new interference scenarios in HetNet deployments due to the large imbalance between the transmission power of macro and pico BSs and the serving cell selection specified by the standard. The traditional approach does not identify the actual interference situation since interference depends not only on the path loss or geometry but also the transmission power.

ICIC has been identified to play a vital role in a variety of deployments in the radio networks. Many ICIC schemes are proposed to improve the performance of ICIC for the Fourth Generation (4G) LTE system. Existing ICIC techniques mainly fall into two categories: static ICIC and dynamic ICIC. The static ICIC provides gains only in some scenarios and no gain and even loses in many others. Dynamic coordination may be necessary to improve ICIC schemes; however, dynamic ICIC can be very computationally complex.

SUMMARY

Particular embodiments of the present invention provide a method enabling network operators to identify the areas with interference problems in a variety of radio networks and to coordinate Radio Resource Management (RRM) features in response. A UE operating in a given area may have interference problems due, for example, to downlink transmissions from base stations in neighboring cells. In addition, uplink transmissions from the UE operating in the given area may cause interference to UEs operating in neighboring cells. The method determines a Δ-measure, which is the difference in signal quality level with and without the contribution of an interfering base station or UE, and compares the difference in signal quality level to a threshold, which is a parameter that enables the network operators to select the level of interference severity at which RRM features should be switched on or off in their specific deployment scenarios. The signal quality level may be, for example, the SINR or Signal-to-Interference-Ratio (SIR) level. The measure can be implemented in many different ways, for example, Δ-measure may be implemented by using any other functions of SINR or functions to be derived from SINR, such as bit rate or throughput, and Δ-measure may also be implemented by using a function of path gain (or path loss) measurement. The exemplary description herein utilizes the SINR as the signal quality level. A well-defined ΔSINR can be applied to any wireless cellular network where SINR is considered as the measurement of performance.

In the HetNet scenario, handover can be problematic because of a mixture of macro and pico cells with different base station transmit powers. The proposed ΔSINR can be used to identify the handover cells and any coordination features between the macro and pico cells.

The proposed method can also be used as a base for any coordinated RRM features. It can also be used in a Self-Organized Network (SON) to trigger on and off SON features depending on deployment scenarios and traffic load situations. In one embodiment, the invention identifies interfering cells, interfered cells, clusters of interfering neighbors, and problematic hot-spots, which can be used as a base for network planning and also in more advanced and coordinated radio resource management features so that coordinated features are applied more efficiently and in a less complex manner. The degree of complexity can be adjusted and scaled by setting the threshold. Additionally, important cell data and cell information of interfering neighbors may be filtered and presented visually in maps of different network deployments. Filtering of important cell data provides the ability to signal only relevant cell data between cells. Furthermore, it provides more efficient signaling between the Centralized Radio Access Network (CRAN) and eNBs in the future CRAN concept.

In one embodiment, the present invention is directed to a method in a cellular radio network in which at least a first User Equipment (UE1) and a second User Equipment (UE2) are operating, wherein UE1 is in a first cell (Cell1) served by a first base station and UE2 is in a second cell (Cell2) served by a second base station, wherein the method determines a level of severity of uplink interference to UE2 caused by UE1. The method includes the steps of determining by an interference analysis tool, a first uplink signal quality level experienced by UE2, wherein the first uplink signal quality level includes uplink interference from UE1; determining by the interference analysis tool, a second uplink signal quality level experienced by UE2, wherein the second uplink signal quality level does not include the uplink interference from UE1; and calculating by the interference analysis tool, a difference (Δ-measure) between the first and second uplink signal quality levels for UE2, wherein the Δ-measure indicates the level of severity of uplink interference to UE2 caused by UE1. The method may also identify the area where UE1 is operating as an interference-causing area when the ΔSINR of UE2 is greater than a threshold value.

In another embodiment, the present invention is directed to a method in a cellular radio network in which at least a first User Equipment (UE1) and a second User Equipment (UE2) are operating, wherein UE1 is in a first cell (Cell1) served by a first base station and UE2 is in a second cell (Cell2) served by a second base station, wherein the method determines a level of severity of downlink interference to UE2 caused by the first base station. The method includes the steps of determining by an interference analysis tool, a first downlink signal quality level experienced by UE2, wherein the first downlink signal quality level includes downlink interference from the first base station; determining by the interference analysis tool, a second downlink signal quality level experienced by UE2, wherein the second downlink signal quality level does not include the downlink interference from the first base station; and calculating by the interference analysis tool, a difference (Δ-measure) between the first and second downlink signal quality levels for UE2, wherein the Δ-measure indicates the level of severity of downlink interference to UE2 caused by the first base station. The method may also identify the area where UE2 is operating as an interference problem area when the (ΔSINR) is greater than a threshold value.

In other embodiments, the method addresses the situation in which an uplink transmission is interfered by a downlink transmission in the neighbor cell (as shown in FIG. 4A), or a downlink transmission is interfered by an uplink transmission in the neighbor cell (as shown in FIG. 4B).

In another embodiment, the invention is directed to an interference analysis tool for determining a level of severity of uplink interference to a second User Equipment (UE2) caused by a first User Equipment (UE1) in a cellular radio network, wherein UE1 is operating in a first cell (Cell1) served by a first base station, and UE2 is operating in a second cell (Cell2) served by a second base station. The interference analysis tool includes a processor and a non-transitory memory connected to the processor for storing computer program instructions, wherein when the processor executes the computer program instructions, the processor causes the interference analysis tool to: determine a first uplink SINR level experienced by UE2, wherein the first uplink SINR level includes uplink interference from UE1; determine a second uplink SINR level ($SINR_0$) experienced by UE2, wherein the second uplink SINR level ($SINR_0$) does not include the uplink interference from UE1; and calculate a difference (ΔSINR) between the first and second uplink SINR levels for UE2, wherein the ΔSINR indicates the level of severity of uplink interference to UE2 caused by UE1.

In another embodiment, the invention is directed to an interference analysis tool in a cellular radio network for determining a level of severity of downlink interference to a User Equipment (UE2) caused by a first base station serving a first cell (Cell1), wherein UE2 is operating in a second cell (Cell2) served by a second base station. The interference analysis tool includes a processor and a non-transitory memory connected to the processor for storing computer program instructions, wherein when the processor executes the computer program instructions, the processor causes the interference analysis tool to: determine a first downlink SINR level experienced by UE2, wherein the first downlink SINR level includes downlink interference from the first base station; determine a second downlink SINR level ($SINR_0$) experienced by UE2, wherein the second downlink SINR level ($SINR_0$) does not include the downlink interference from the first base station; and calculate a difference (ΔSINR) between the first and second downlink SINR levels for UE2, wherein the ΔSINR indicates the level of severity of downlink interference to UE2 caused by the first base station.

In other embodiments, the interference analysis tool is configured to address the situation in which an uplink transmission is interfered by a downlink transmission in the neighbor cell (as shown in FIG. 4A), or a downlink transmission is interfered by an uplink transmission in the neighbor cell (as shown in FIG. 4B).

Certain embodiments of the present invention can be used as a tool by network operators to analyze their network, to identify the areas with interference problems, and to identify areas where potential performance gains can be achieved by RRM features. Particular embodiments can be used to decide whether advanced RRM features, such ICIC or coordinated scheduler, should be facilitated and where the RRM features need to be switched on or off. Particular embodiments of the invention can also be used as a base for Self-Organized Network (SON) features. Particular embodiments may provide cost savings since the signaling load and the complexity of calculations are lowered for enabling RRM features.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that the invention can be implemented in hardware or in a combination of hardware processor(s) and computer program instructions stored on a non-transitory storage medium.

Particular embodiments of the present invention provide a method enabling network operators to identify the areas with interference problems in a variety of radio networks. The proposed method provides a tool to select areas and cells where coordinated radio resource management features should be applied. The proposed method includes a Δ-measure, which facilitates the identification of problem areas. A threshold (thr) value enables network operators to select a level of interference severity at which RRM features are employed. Additional features enhance the visualization of relevant cell data and improve the efficiency of cell data signaling.

Identification of Areas with an Interference Problem

A Δ-measure facilitates the identification of problem areas by measuring the potential benefit of coordinating a user. This measure tells a network manager whether a user has the potential of solving an interference problem. The Δ-measure can be used to highlight users based on the target provided by coordinated RRM features such as, for example ICIC, load balancing, and other features in relation to neighboring cells and handover.

More specifically, focusing on the well-known inter-cell interference problem in cellular radio networks, the signal to noise and interference ratio (SINR) has been a major criterion of radio resource management functions. The Δ-measure for the inter-cell interference problem can be defined as ΔSINR. Since interference management schemes are targeted to avoid interference from a UE in a neighboring cell, ΔSINR is then defined as the difference of SINR measurement with and without an interfering UE from a neighboring cell.

Figure 1:
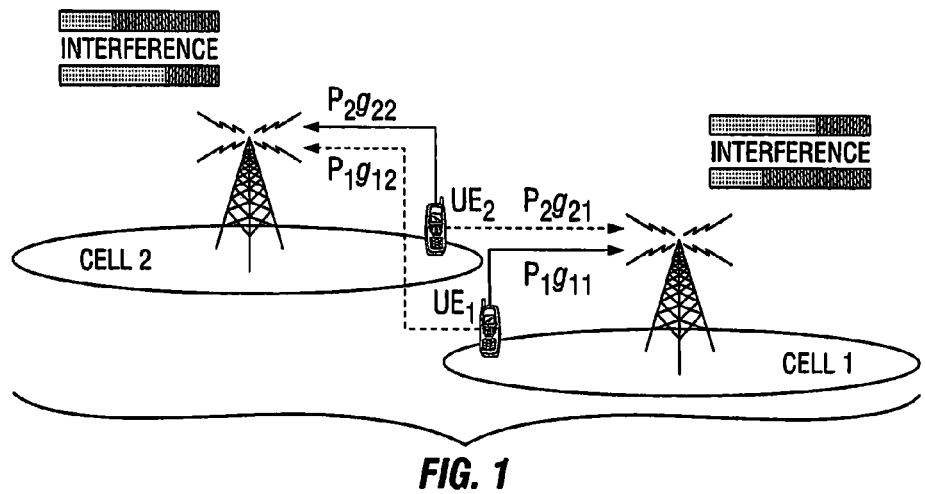
FIG. 1 is an illustrative drawing of two cells in a 3GPP LTE network illustrating a method of uplink interference analysis and its impact on uplink system performance.

FIG. 1 is an illustrative drawing of two cells in a 3GPP LTE network illustrating a method of uplink interference analysis. A first cell (Cell 1) and a second cell (Cell 2) are shown. Cell 1 serves a first User Equipment (UE1) and Cell 2 serves a second UE (UE2).

In an LTE system, the basic resource element is the physical resource block (PRB). In the uplink case, the serving cell scheduler allocates a number of consecutive PRBs to the users and power control allocates the transmitting power on each PRB (i.e., power density) for each UE. Assuming that UE1 and UE2 are transmitting on the allocated PRBs, $P_1$ and $P_2$ are the allocated transmission power for UE1 and UE2 respectively. Let $g_{ij}$ be the estimated path gain from UE i to cell j, that is, $g_{11}$ and $g_{22}$ are the estimated path gains between serving cells and UE1 and UE2, and $g_{21}$ and $g_{12}$ is estimated path gain to their neighboring cells. The receiving power in serving cell is estimated by $P_1 g_{11}$ and $P_2 g_{22}$, while the interfering power received in neighboring cell is estimated by $P_1 g_{12}$ and $P_2 g_{21}$.

From a cell point of view, there are two ways to analyze the uplink interference: interference caused by the neighbors and interference to the neighbors. The analysis first looks at interference caused by the neighbors.

The uplink SINR of UE2 with interference from UE1 is:

$$SINR = \frac{P_2 g_{22}}{P_1 g_{12} + I_0} \quad (1)$$

and without interference from UE1 is:

$$SINR_0 = \frac{P_2 g_{22}}{I_0} \quad (2)$$

where $I_0$ is background noise and the rest of the interference.

Let $\Delta SINR_{ij}$ be the difference in SINR of UEs in cell j with or without UE i, then the difference in SINR, $\Delta SINR_{12}$, of UE in cell 2 with and without interference from UE1 is:

$$\Delta SINR_{12} = 10\log(SINR_0) - 10\log(SINR) = 10\log\left(1 + \frac{P_1 g_{12}}{I_0}\right) \quad (3)$$

$\Delta SINR_{12}$ is the difference in SINR for a PRB seen from Cell 2 with and without interfering UE1 in Cell 1 and is the impact on SINR for UE2 with and without the interference from UE1 on a PRB if it is used by UE1. This may also be referred to herein as "a drop in SINR with the interfering UE in the neighboring cell".

The case may be generalized to consider additional neighbors and other positions (i.e., mobility) of UE1. For each PRB, $\Delta SINR_{12}$ varies depending on two factors: the interference level $I_0$ and the interfering power $P_1 g_{12}$ level. They are shown in FIG. 2 and FIG. 3, respectively.

Figure 2:
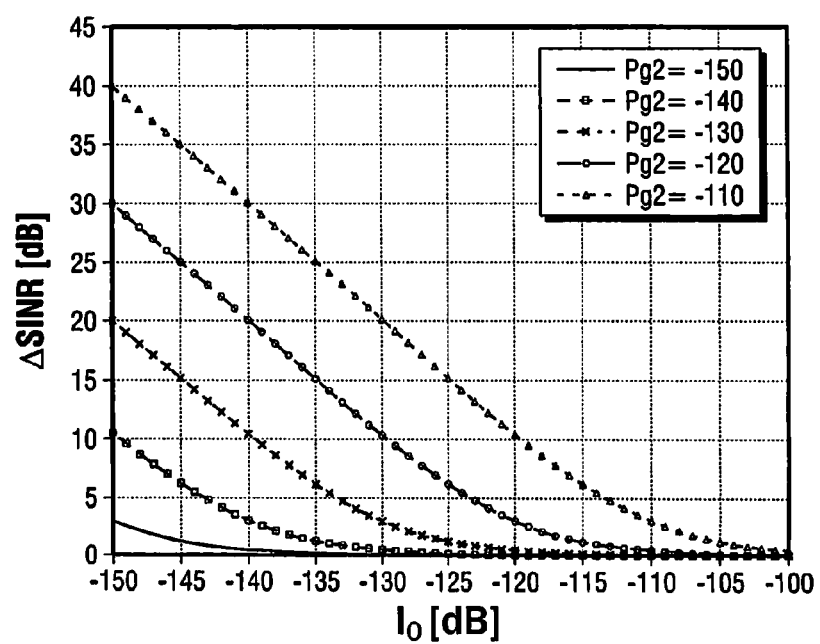
FIG. 2 is a graph showing the impact on SINR when the load of a PRB increases.

FIG. 2 is a graph showing the impact on $\Delta SINR$ when the load of a PRB increases. The factor $I_0$, which is the interference level on each PRB in cell 2 without interference from UE1, varies depending on the load of the PRBs. Each PRB may suffer from different inter-cell interference because each PRB can be used by several different neighboring cells at the same transmission time interval (TTI). As shown in FIG. 2, the interference level is varied typically from only the background noise level, e.g. −150 dB, to a fully loaded level, −100 dB.

Each curve corresponds to one interfering power level. For example, at the interfering power level $P_1 g_{12}$=−120 dB, we can see that the impact on $\Delta SINR$ decreases, from 30 dB to 0 dB, when the load on PRB increases.

Figure 3:
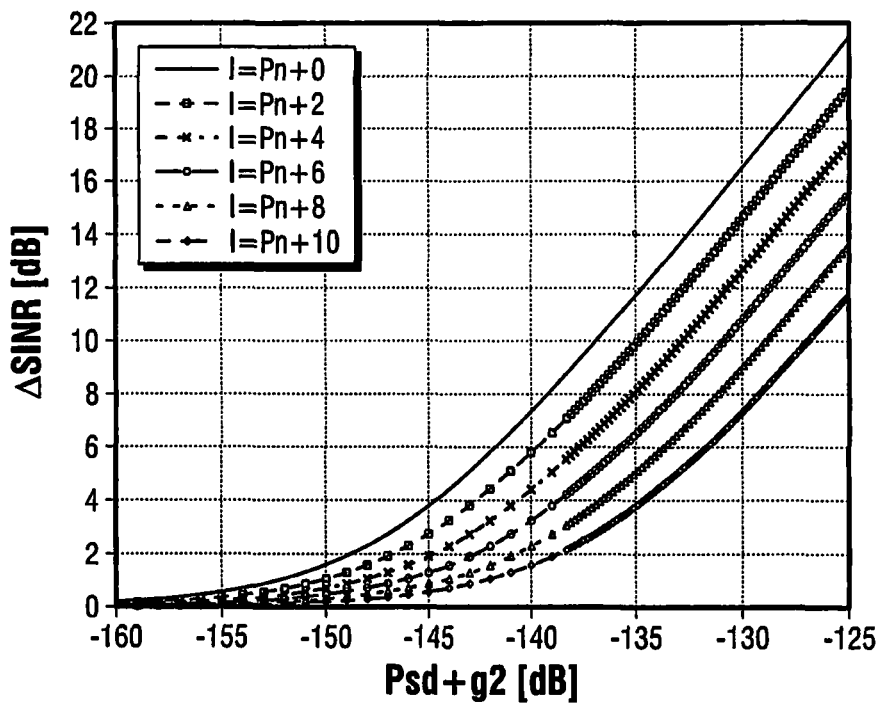
FIG. 3 is a graph showing the impact on SINR when the interfering power increases.

FIG. 3 is a graph showing the impact on $\Delta SINR$ when the interfering power increases. The factor $P_1 g_{12}$, which is the interfering power level, depends on the transmission power $P_1$, either power-controlled or non power-controlled, and the path gain to the neighboring cell $g_{12}$ which can be viewed as how far away or close the interfering UE1 is to Cell 2. The interfering power can vary from a low level, e.g. −160 dB, to a high level of −125 dB as shown in FIG. 3. The UE transmission power used in FIG. 3 is power-controlled with α=0.8 and SNR target 10 dB. Usually the interfering power is lower when the interfering UE is far away from the neighboring cell, while it is higher when the interfering UE is close to the neighboring cell. Each curve corresponds to one interference level on PRBs and can be viewed as a UE moving towards the neighboring cell.

The traditional way to identify an area with an interference problem is to classify the UE to be either a cell-center UE, which has a lower interfering power, or a cell-edge UE, which has a higher interfering power. $\Delta SINR$ given in Equation (3) shows that the impact on SINR, or the drop in SINR, is not only dependent on the interfering power level but is also relative to the interference level or the load of the PRBs.

We can see from FIG. 2 that an interfering UE can cause the same drop in SINR in a neighboring cell, e.g. 20 dB, in a position where the interfering power is $P_1 g_{12}$=−130 dB and a position where the interfering power is $P_1 g_{12}$=−110 dB.

FIG. 3 shows that when load on PRBs is low, e.g. only the background noise without any other interference, $I_0$=−146, even a quite cell-center UE with a low interfering power, e.g. $P_1 g_{12}$=−140 dB, may cause the same drop in SINR, e.g. 8 dB, in a neighboring cell as a cell-edge UE with a higher interfering power, $P_1 g_{12}$=−130 dB when the load on PRB is 10 dB higher.

The $\Delta SINR_{ij}$ can also be used to analyze the interference to the neighbors. Considering the example discussed above in which UE 1 is in Cell 1 and UE 2 is in Cell 2, the interference generated by UE2 in Cell 2 to the neighbor Cell 1 is the same as the interference received in Cell 1 from UE2 in Cell2, i.e. $\Delta SINR_{21}$, which can be expressed as:

$$\Delta SINR_{21} = 10\log\left(1 + \frac{P_2 g_{21}}{I_{01}}\right) \quad (4)$$

From the Cell 2 point of view, the interference caused by UE2 to Cell 1 is $\Delta SINR_{21}$ as given by equation (4) while the received interference from Cell 1 is $\Delta SINR_{12}$ as given by equation (3). Note that the interference level $I_0$ in (4) is denoted by $I_{01}$. This is because the interference level is cell as well as load dependent. For simplicity, we have used $I_0$ in (3), which should be denoted as $I_{02}$.

The $\Delta$-measure introduced to characterize the impact of interference on the performance is $\Delta SINR$ described in (3) or (4), which is the drop in SINR with the interfering UE from a neighboring cell.

Downlink Interference Analysis

Figure 4A:
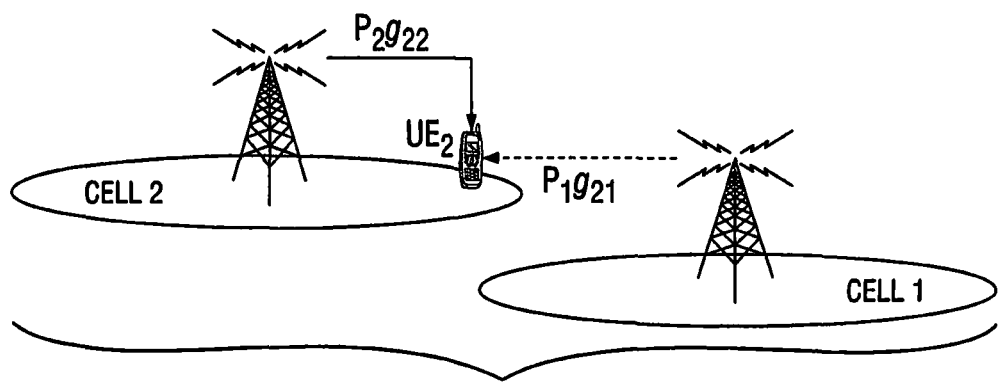
FIG. 4A is an illustrative drawing of two cells illustrating a scenario for analyzing downlink interference and its impact on downlink system performance.
Figure 4B:
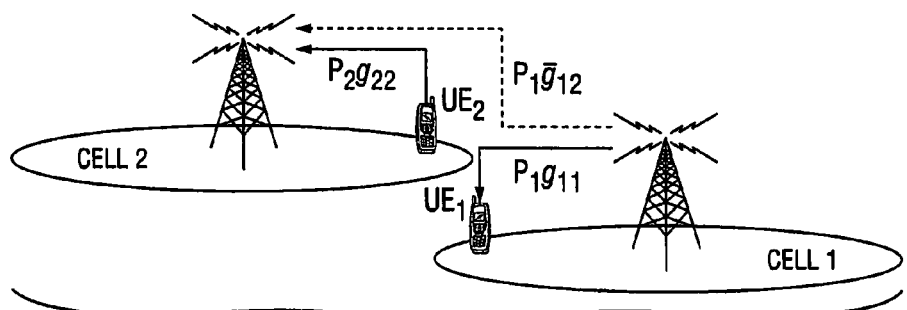
FIG. 4B is an illustrative drawing of two cells illustrating a scenario for analyzing downlink interference and its impact on uplink system performance.
Figure 4C:
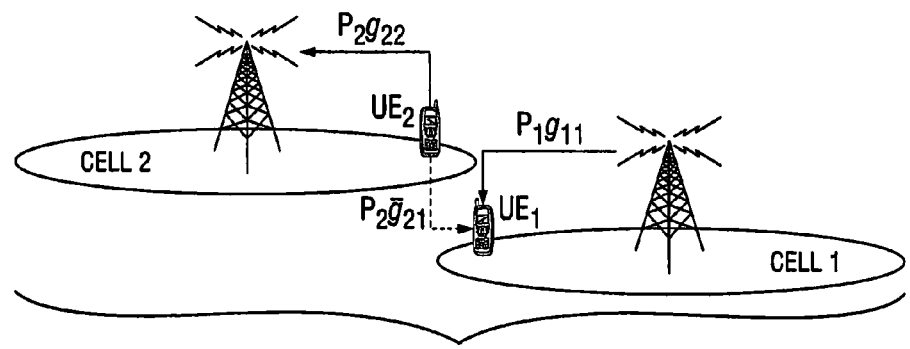
FIG. 4C is an illustrative drawing of two cells illustrating a scenario for analyzing uplink interference and its impact on downlink system performance.

FIG. 4 is an illustrative drawing of two cells illustrating a scenario for analyzing downlink interference and its impact on system performance. The impact of downlink interference may be analyzed by using the $\Delta SINR$. In the downlink, as shown in FIG. 4, $P_1$ and $P_2$ represent base station transmission power. In a typical macro network deployment, the base station transmission powers $P_1$ and $P_2$ are often the same. However, in a HetNet with a mixture of macro and pico network deployment, $P_1$ and $P_2$ can be very different. The analysis based on $\Delta SINR$ is therefore valid for not only any macro deployment, but also for HetNet.

The downlink SINR of UE2 with interference from cell 1 can be estimated by:

$$SINR = \frac{P_2 g_{22}}{P_1 g_{21} + I_0} \quad (5)$$

and without interference from Cell 1 is:

$$SINR_0 = \frac{P_2 g_{22}}{I_0} \quad (6)$$

where $I_0$ is background noise and the rest of the interference.

The downlink $\Delta SINR$ of UE2 with and without interference from Cell 1 is:

$$\Delta SINR = 10\log(SINR_0) - 10\log(SINR) = 10\log\left(1 + \frac{P_1 g_{21}}{I_0}\right). \quad (7)$$

The areas with downlink inter-cell interference can be identified by $\Delta SINR$ defined as (7). The downlink inter-cell interference can be seen as the occurrence of a strong neighboring cell. $\Delta SINR$ can be used to identify whether a UE has a pico neighbor or a macro neighbor. $\Delta SINR$ can then be used to identify handover areas in the network taking into consideration the interference level and transmission power.

In a system where uplink and downlink are transmitted in the same frequency bandwidth, e.g. a TDD system, the inter-cell interference could be caused by a downlink transmission interfering with a neighboring cell uplink transmission, or an uplink transmission could interfere with a neighboring cell downlink transmission. The interference can be also be analyzed by $\Delta$SINR as in equations (3) or (7). However, the estimation of interfering power should depend on whether the interference comes from the base station, e.g. Cell 1 $P_1\bar{g}_{12}$, or from the UE equipment, e.g. UE2, $P_2g_{21}$, where the path gain $\bar{g}_{12}$ is from base station 1 to base station 2 and the path gain $g_{21}$ is from UE 2 to UE 1.

Estimation of $\Delta$SINR

To estimate $\Delta$SINR in a deployed network, it may be necessary to use realistic site data and relevant information such as antenna data and RBS equipment to predict the propagation based on propagation models on the map of the network. Cell planning tools such as the TEMS Cell Planner provide cell-based or bin-based data, which can be used to estimate the path gain to the serving and neighboring cells. With the knowledge of path gain to the neighboring cell $g_{12}$ or $g_{21}$ and the transmission power, the uplink interfering power $P_1g_{12}$ or $P_2g_{21}$ can be calculated. The downlink interfering power $P_1g_{21}$ or $P_2g_{12}$ can also be calculated similarly. The interference level $I_0$ depends on the cell load of the network. In the cell planning stage, the background noise level $P_n$ of the cell may be used as a default value, which is the scenario when cell load is low in the network. Thus $\Delta$SINR can be estimated by Equation (3) or (4) or (7). When the cell load in the network increases, $I_0$ can be updated based on the statistics of cell load in the network. Normally, the statistics of cell loads during a day's time are available in an operational network. The interference level, $I_0$, can be estimated accordingly. The analysis shown in FIG. 2 indicates the impact of interference level on $\Delta$SINR. We can conclude from the analysis that the impact on SINR decreases when the cell load increases. Hence, the gain of coordinating a single user decreases at high load compared to the gain at low load.

Dynamic Tuning of Estimated $\Delta$SINR

The estimated $\Delta$SINR is based on the network database and some propagation models. The estimation is static and may not capture the actual interference situation in the operational network. To improve the estimation, $\Delta$SINR can be tuned or estimated dynamically if the relevant measurements are available in the eNodeB or any centralized unit in the network.

To obtain relevant information in a decentralized eNodeB, extra signaling may be necessary to estimate $\Delta$SINR for the uplink case. Considering the estimation of received interference in Cell 2, $\Delta$SINR$_{12}$ by Equation (3), Cell 2 needs information to estimate interfering power $P_1g_{12}$, which is only available in the neighboring Cell 1 since Cell 1 knows the transmission power of UE1 and has the neighboring cell measurement reports from UE1 either periodically or event-triggered. However the interfering power $P_1g_{12}$ is not available in Cell 2. Hence it may be necessary to signal this information from Cell 1 to Cell 2 to update $\Delta$SINR$_{12}$ dynamically. Cell 1 may either signal the level of interfering power $P_1g_{12}$ to Cell 2 or signal the transmission power of UE1, $P_1$, and the path gain $g_{12}$ so that Cell 2 is able to calculate the interfering power $P_1g_{12}$. Cell 2 is then able to estimate $I_0$ by the equation:

$$I_0 = I_{total} - I(1)$$

where I(1) is the estimated interfering power $P_1g_{12}$, and the total noise and interference $I_{total}$ in Cell 2 may be measured. Dynamically estimating $\Delta$SINR by the interference analysis tool in the second base station can be performed by using Equation (3) above.

Figure 5:
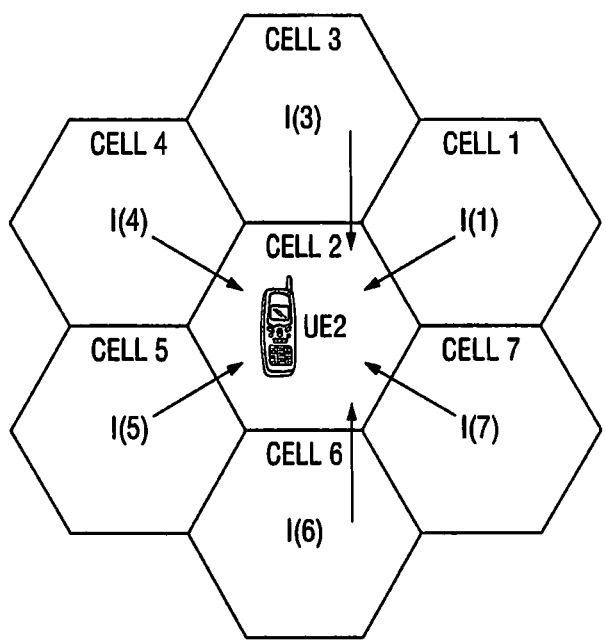
FIG. 5 is an illustrative drawing of a cluster of cells illustrating the interference experienced by Cell 2 from surrounding neighbor cells.

FIG. 5 is an illustrative drawing of a cluster of cells illustrating the interference from surrounding neighbor cells measured in Cell 2 for a PRB. Cell 2 may request other surrounding neighbor cells to signal the interference power so that Cell 2 can estimate the interfering power I(1), if it is not available in Cell 2, by:

$$I_{total} = I(1) + \Sigma I(i) + N$$

and hence dynamically updating $\Delta$SINR.

Since the total noise and interference $I_{total}$ in Cell 2 may be measured, cell 2 can also signal the total interference $I_{total}$ for a PRB to all relevant cells, Cell 1 in this example. Then Cell 1 knows how much interference its users have caused during the measuring period and can then estimate $I_0$ for Cell 2 according to:

$$I_0 = I_{total} - I(1)$$

Cell 1 may signal $I_0$ to Cell 2. Dynamically estimating $\Delta$SINR by the interference analysis tool in the second base station can be performed by using Equation (3) above.

Considering the estimation of interference caused to the neighboring Cell 1, $\Delta$SINR$_{21}$ as Equation (4), the interfering power $P_2g_{21}$ is available in Cell 2. However the interference level or the current load of Cell 1, $I_{01}$, is unknown in Cell 2. To estimate $\Delta$SINR dynamically in a decentralized fashion, it may be necessary to signal the interference level of Cell 1 to Cell 2. Cell 2 can then dynamically estimate the level of interference Cell 2 is causing to Cell 1, $\Delta$SINR$_{21}$, using Equation (4) above.

For the downlink, the interference in Cell 2 is caused by the transmission of the base station in neighboring Cell 1. The path gain to Cell 1 is available in Cell 2 via UE neighboring cell measurement reports, and Cell 2 also knows its own interference level. However, the transmission power of Cell 1 may not be always known to Cell 2. To dynamically update $\Delta$SINR by Equation (7), signaling of the transmission power of the first base station ($P_1$) may be required.

In the case there is a centralized unit in the network, for example an RNC in a WCDMA network or a CRAN in an LTE network, all the relevant information will be available in the centralized unit, so $\Delta$SINR can be updated or estimated dynamically.

Threshold to Control the Level of Severity

As noted above, certain embodiments of the present invention also utilize a threshold as a parameter that enables network operators to select the level of interference severity at which radio resource management features should be switched on or off in their specific deployment scenarios. The threshold may also be used in Self Organized Network (SON) to trigger on and off SON features.

For simplicity of description, the term $\Delta$SINR is used in the remainder of this description instead of $\Delta$SINR$_{ij}$.

To illustrate use of the threshold, the uplink inter-cell interference problem can be used as an example, where $\Delta$SINR is given by Equation (3). A threshold can be selected to control the areas where RRM features should be switched on if $\Delta$SINR>thr or switched off if $\Delta$SINR$\leq$thr. With a pre-defined threshold, high interfering neighbors and clusters of neighbors can be identified, so that RRM features which require X2-coordination can be applied efficiently.

Figure 6:
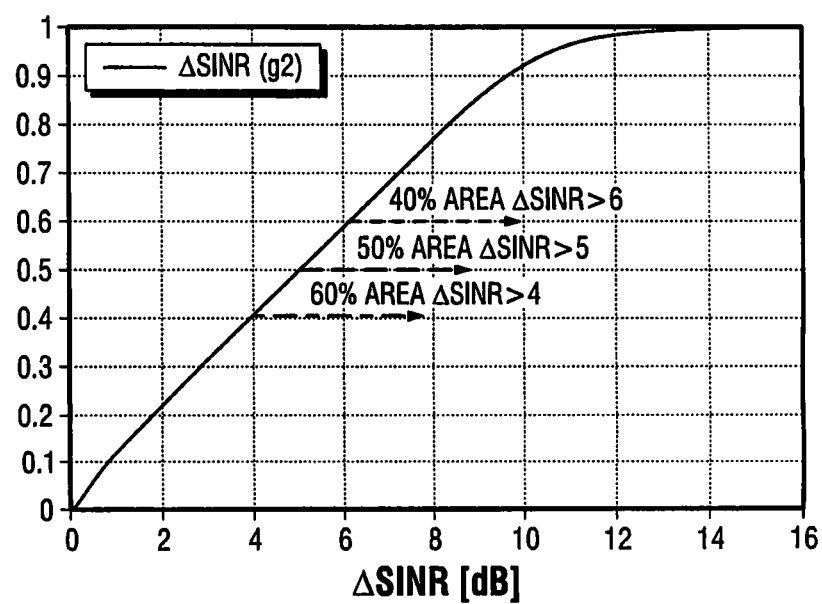
FIG. 6 is a graph showing the percentage of the network area in which ΔSINR is greater than various threshold values.

FIG. 6 is a graph showing the percentage of the network area in which $\Delta$SINR is greater than various threshold values. The percent of areas with interference problem is dependent on the threshold. In this network, we can see that 60% of areas are identified with $\Delta$SINR>4 dB and 40% of areas are identified with $\Delta$SINR>6 dB. The network operators may select different interference management solutions depending on the severity of the interference. Moreover, the threshold can be adjusted to scale the computational complexity and signaling load for coordinated RRM algorithms. As is seen from FIG. 6, the higher the threshold, the smaller percent of areas coordination is needed. Hence the number of users who need to be coordinated reduces as well.

The threshold can be adjusted to be UE-dependent considering ΔΔSINR has a different impact on different users. ΔSINR may have a larger impact on users who have lower SINR than on users who have high SINR. For example, a ΔSINR of 3 dB can improve the performance by saving a user from dropping while it cannot improve the performance of a user who is already using the highest Modulation and Coding Scheme (MCS) or bit rate or who is buffer-limited. Considering also that the bit rate or MCS is stepwise, the gain in SINR does not always provide the gain in bit rate. There is very little impact within the bit rate mapping steps, but large impact between the bit rate jump steps.

Visualization of Relevant Cell Data

In a further embodiment, the present invention can be used as a tool to visualize the problem areas in any radio network and the impact of RRM solutions in the identified areas. To illustrate this, the interference problem in an exemplary suburban cellular network can be analyzed, and a network cell map for the network can be displayed, shaded to show serving cell IDs.

When shown on an actual computer display, colors may be utilized to better distinguish different cells and different interference levels in different areas. For each position on the map, the long-term path gain (the distance-dependent path gain and shadow fading) to the serving cell and the strongest neighboring cell are usually available or can be estimated. For each position, ΔSINR can then be calculated by:

$$\Delta SINR = \log\left(1 + \frac{Pg_2}{I_0}\right)$$

where $g_2$ is the path gain between the position and the strongest neighboring cell. $I_0$ is the interference level at the position, for example $I_0 = -146$ dB. If there is a UE in this position, assuming open-loop power control is used, the transmission power P can be estimated as:

$$P = \min\{P_{max}, P_0 - \alpha \cdot g_1\}$$

where $g_1$ is the path gain between the position and the serving cell, and α and $P_0$ are parameters, for example α=0.8 and $P_0 = -113$ dB. $P_{max}$ is the maximum UE power, for example $P_{max} = 21$ dBm.

The shading of different serving cell areas may be altered so that different cells can be seen in isolation. In addition, the service area of a particular cell may be shaded to show high interference risk areas, for example, areas with ΔSINR>4 dB. The shading may also show which cell, or cells, is causing the interference. The network cell map may alternatively be shaded to show the actual value of ΔSINR throughout the network. The shading range may vary from 4 dB to 20 dB, for example, with white spots representing areas with ΔSINR≤4. The network cell map thus illustrates the areas where coordinated RRM features, such as ICIC, may be required. The cell map may be filtered so that only the areas with interference problems are shown. In another alternative, the network cell map may be shaded to show serving cell path gain.

An urban area map with micro-macro cellular deployment may also be displayed, shaded to show interference problem areas. The coverage maps produced by the particular embodiments of interference analysis tool 10 enable network operators to visualize areas of high interference risk for networks with both macro and micro deployment. The coverage maps produced by particular embodiments of interference analysis tool 10 also enable network operators to differentiate indoor and outdoor RRM solutions in their networks. The maps can readily show, for example, that indoor areas correspond to areas of lower interference risk. Thus, for coordinated RRM, such as coordinated scheduler, it may be more efficient to move or mute users in outdoor areas in order to improve the SINR.

The coverage maps are also extremely valuable for planning purposes in a network. For example, a ΔSINR map may show an area with ΔSINR>16 dB. It is known that this area is also a hotspot. If a pico cell is placed in this area and the transmit power of the UEs is lowered by 10 dB, then it follows that the pico cell will lower ΔSINR at least 9 dB according to the calculation below:

$$10\log\left(1 + \frac{Pg_2}{I_0}\right) - 10\log\left(1 + \frac{Pg_2}{10I_0}\right) > 16 - 10\log\left(1 + \frac{10^{1.6} - 1}{10}\right).$$

As another example, an indoor galleria may be identified as a hotspot and the galleria with a low ΔSINR<4 dB on the map. Again suppose that a pico cell is placed here and the transmit power of the UEs is lowered by 10 dB. Then ΔSINR in any other cell will be improved by at most 3.4 dB.

Signaling Relevant Cell Data in a Live Network

RRM features that take interference into account need information about the users scheduled in a TTI. This information can be sent to a CRAN or to eNBs. To support the CRAN and coordinated eNBs, signaling between the CRAN and the cells is important for coordinated RRM features. The complexity in terms of signaling and computational load is often too large to be practical. In order to calculate ΔSINR taking into account fast variations, $I_{total}$ needs to be signaled as described above.

A further embodiment of the present invention provides a tool to identify which users and cells need to be coordinated. This enables a reduction in the signaling and computational complexity by only considering users and cells such that ΔSINR>thr. In one example, only user data about scheduled users exceeding the threshold is transmitted to the relevant eNBs or the CRAN (see example pseudo code).

Figure 7:
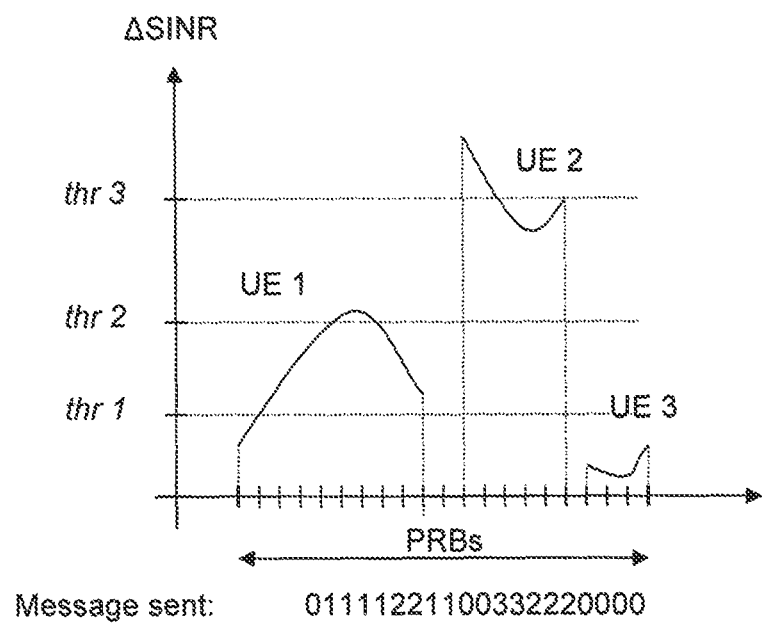
FIG. 7 is a graphical representation illustrating the use of a new interference indicator.

If ΔSINR>thr
  Send: Certain UE information, for example ΔSINR; buffer status; and neighboring cell ID for coordination
End FIG. 7 is a graphical representation illustrating the use of a new interference indicator. An even more compact signaling schema is to define a new interference indicator signaled over the X2 interface similarly to the High Interference Indicator (HII) as specified in 3GPP TS 36.331. This new X2 indicator may, for example, signal that ΔSINR for a scheduled user per Physical Resource Block (PRB) exceeds a predefined threshold level. As illustrated in FIG. 7, a number of threshold levels can be predefined. Three such threshold levels are shown in the illustrated example. The indicated value or signaling value is ΔSINR quantified by the threshold levels as:

If ΔSINR≥thr i and ΔSINR<thr i+1 indicated value=i i=0, 1, 2, 3
  end
  thr0=0 and thr4=∞

Figure 8A:
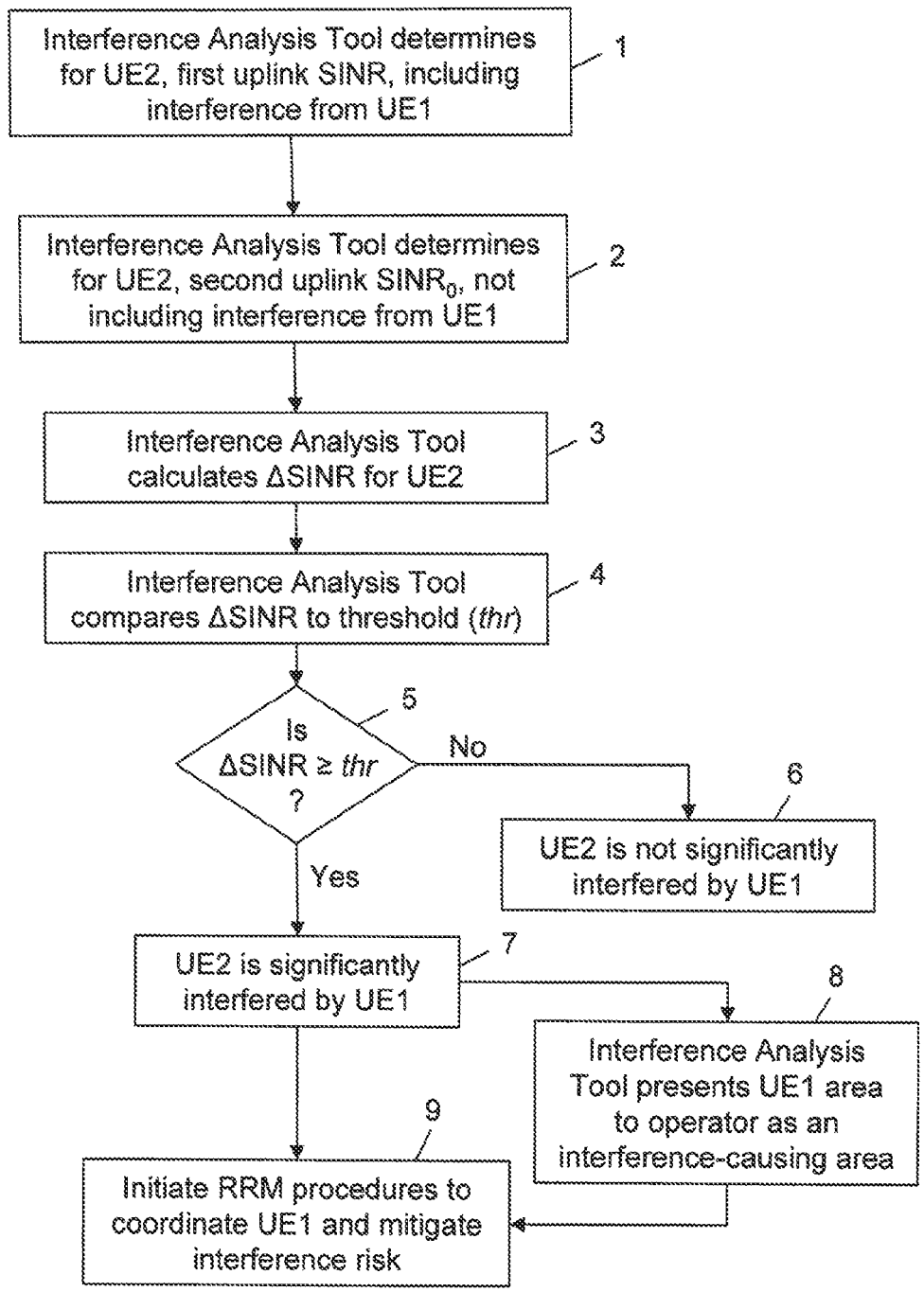
FIG. 8A is a flow chart illustrating the steps of an exemplary embodiment of the method of the present invention when analyzing uplink interference.

FIG. 8A is a flow chart illustrating the steps of an exemplary embodiment of the method of the present invention when analyzing uplink interference. The method is performed by an interference analysis tool 10, which may be implemented in the base station (for example, eNodeB) serving UE2. The method enables the tool to identify an interference problem area in a cellular radio network in which at least a first User Equipment (UE1) and a second User Equipment (UE2) are operating, wherein UE1 is in a first cell (Cell1) served by a first base station, and UE2 is in a second cell (Cell2) served by a second base station.

At step 1, the interference analysis tool 10 determines for UE2, a first uplink SINR level, including the interference from UE1, using the procedures described above. At step 2, the interference analysis tool determines for UE2, a second uplink $SINR_0$ level, which does not include the interference from UE1. At step 3, the interference analysis tool calculates a difference ($\Delta SINR$) between the first and second uplink SINR levels for UE2 using, for example, Equation (3) or (4). At step 4, the interference analysis tool compares $\Delta SINR$ to a threshold value (thr).

At step 5, it is determined whether the $\Delta SINR$ is greater than or equal to the threshold value (thr). If not, the method moves to step 6 where the interference analysis tool 10 concludes that UE2 is not significantly interfered by UE1. However, if the $\Delta SINR$ is greater than or equal to the threshold value (thr), the method moves to step 7 where the interference analysis tool concludes that UE2 is significantly interfered by UE1. At step 8, the method may then optionally present the UE1 area to the operator as an interference-causing area. At step 9, RRM procedures are initiated, either automatically by the interference analysis tool 10 or manually by the operator, to coordinate UE1 and mitigate the interference risk from the interference-causing area.

Figure 8B:
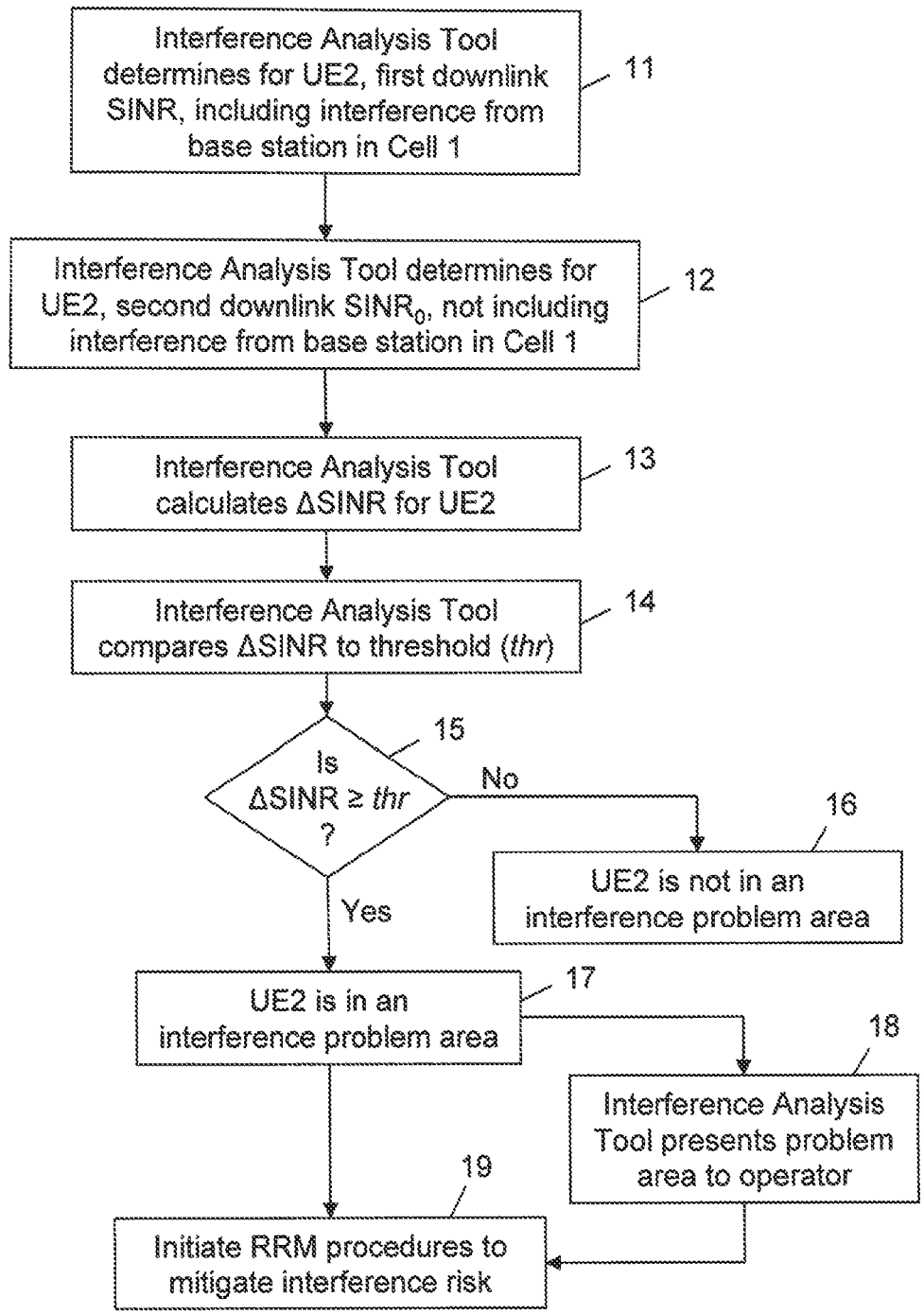
FIG. 8B is a flow chart illustrating the steps of an exemplary embodiment of the method of the present invention when analyzing downlink interference.

FIG. 8B is a flow chart illustrating the steps of an exemplary embodiment of the method of the present invention when analyzing downlink interference. The method is performed by an interference analysis tool 10, which may be implemented in the base station (for example, eNodeB) serving UE2. The method enables the tool to identify an interference problem area in a cellular radio network in which at least a first User Equipment (UE1) and a second User Equipment (UE2) are operating, wherein UE1 is in a first cell (Cell1) served by a first base station, and UE2 is in a second cell (Cell2) served by a second base station.

At step 11, the interference analysis tool 10 determines for UE2, a first downlink SINR level, including the interference from the base station in Cell 1, using the procedures described above. At step 12, the interference analysis tool determines for UE2, a second downlink $SINR_0$ level, which does not include the interference from the base station in Cell 1. At step 13, the interference analysis tool calculates a difference ($\Delta SINR$) between the first and second downlink SINR levels for UE2 using, for example, Equation (7). At step 14, the interference analysis tool compares $\Delta SINR$ to a threshold value (thr).

At step 15, it is determined whether the $\Delta SINR$ is greater than or equal to the threshold value (thr). If not, the method moves to step 16 where the interference analysis tool 10 concludes that UE2 is not in an interference problem area. However, if the $\Delta SINR$ is greater than or equal to the threshold value (thr), the method moves to step 17 where the interference analysis tool concludes that UE2 is in an interference problem area. The method may then optionally present the interference problem area to the operator at step 18. At step 19, RRM procedures are initiated, either automatically by the interference analysis tool 10 or manually by the operator, to mitigate the interference risk in the problem area.

Figure 9:
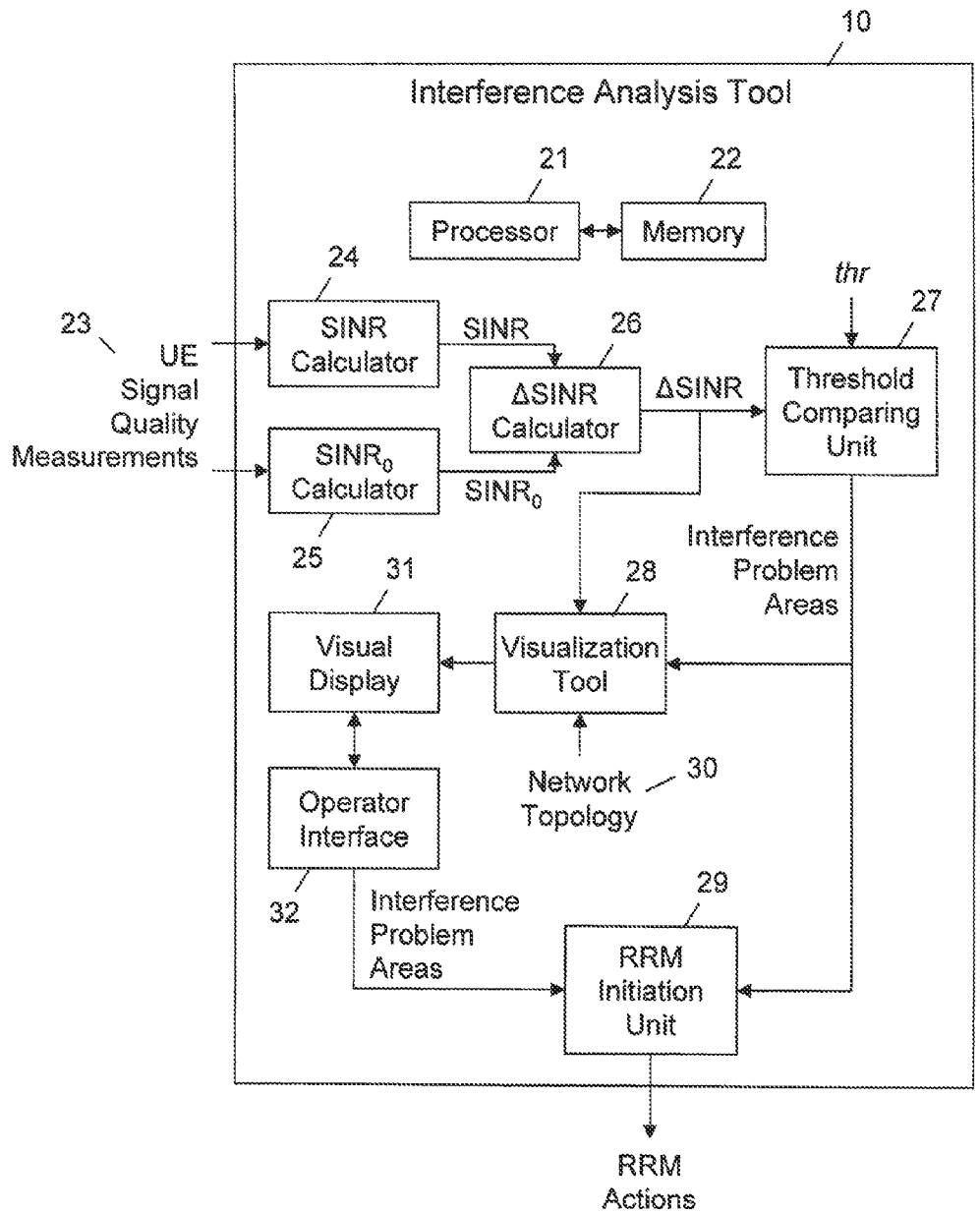
FIG. 9 is a simplified block diagram of an interference analysis tool in an exemplary embodiment of the present invention.

FIG. 9 is a simplified block diagram of an interference analysis tool 10 in an exemplary embodiment of the present invention. The tool may be implemented in hardware or in a combination of hardware processor(s) and computer program instructions stored on a non-transitory storage medium. In the illustrated embodiment, the tool is controlled by a processor 21 executing computer program instructions stored on the non-transitory memory 22.

UE signal quality measurements 23 are received in an SINR calculator 24 and an $SINR_0$ calculator 25. Each passes its result to a $\Delta SINR$ calculator 26. The $\Delta SINR$ calculator sends the calculated or estimated $\Delta SINR$ to a threshold comparing unit 27, which determines whether $\Delta SINR$ is greater than or equal to the threshold, thr. The $\Delta SINR$ may also be sent to a visualization tool 28. The threshold comparing unit identifies areas in which the $\Delta SINR$ is greater than or equal to thr and determines they are interference problem areas. The threshold comparing unit outputs indications of the interference problem areas to one or both of a visualization tool 28 and an RRM initiation unit 29. The visualization tool includes knowledge of the network topology 30 for the cellular radio network, and may utilize a visual color display 31 to display to an operator, the severity of interference levels in different areas of the network.

The operator may use an operator interface 32 to select different information to be displayed. The operator may also use the interface to initiate RRM procedures in the network through the RRM initiation unit 29. Alternatively, the RRM initiation unit may automatically initiate the RRM procedures upon receiving the indications of the interference problem areas from the threshold comparing unit 27.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a cellular radio network in which at least a first User Equipment (UE1) and a second User Equipment (UE2) are operating, wherein UE1 is in a first cell (Cell1) served by a first base station and UE2 is in a second cell (Cell2) served by a second base station, wherein the method determines a level of severity of interference to UE2 originating in Cell1, wherein the interference to UE2 originating in Cell1 is uplink interference caused by uplink transmissions from UE1, the method comprising the steps of:

determining by an interference analysis tool, a first signal quality level experienced by UE2, wherein the first signal quality level includes the interference originating in Cell1, wherein determining the first signal quality level includes determining a first uplink Signal-to-Interference-and-Noise-Ratio level (SINR) experienced by UE2, wherein the first uplink SINR level includes uplink interference from UE1;

determining by the interference analysis tool, a second signal quality level experienced by UE2, wherein the second signal quality level does not include the interference originating in Cell1, wherein determining the second signal quality level includes determining a second uplink SINR level ($SINR_0$) experienced by UE2, wherein the second uplink SINR level ($SINR_0$) does not include the uplink interference from UE1; and calculating by the interference analysis tool, a difference ($\Delta$-measure) between the first and second signal quality levels for UE2, wherein the $\Delta$-measure is a difference ($\Delta SINR$) between the first and second uplink SINR levels for UE2 indicating the level of severity of interference to UE2 originating in Cell1;

wherein the step of determining the first uplink SINR level experienced by UE2 includes calculating the first uplink SINR level such that:

$$SINR = \frac{P_2 g_{22}}{P_1 g_{12} + I_0}$$

where:
- $P_2$ is an allocated transmission power for UE2;
- $g_{22}$ is an estimated path gain from UE2 to the second base station;
- $P_1$ is an allocated transmission power for UE1;
- $g_{12}$ is an estimated path gain from UE1 to the second base station; and
- $I_0$ is background noise and other interference.

2. The method as recited in claim 1, further comprising identifying an area of Cell 2 where UE2 is operating as an interference-problem area when the Δ-measure of UE2 is greater than a threshold value.

3. The method as recited in claim 1, further comprising identifying an area of Cell 1 where UE1 is operating as an interference-causing area when the Δ-measure of UE2 is greater than a threshold value.

4. The method as recited in claim 1, further comprising performing Radio Resource Management (RRM) procedures to reduce a risk of interference problems for UE2 caused by UE1 when the Δ-measure of UE2 is greater than a threshold value.

5. The method as recited in claim 4, wherein the step of performing RRM procedures includes reducing an allocated transmission power for UE1 ($P_1$).

6. The method as recited in claim 1, wherein the interference analysis tool is implemented or located in a centralized unit in the cellular radio network.

7. The method as recited in claim 1, wherein the step of determining the second uplink SINR level ($SINR_0$) experienced by UE2 includes calculating the second uplink SINR level ($SINR_0$) such that:

$$SINR_0 = \frac{P_2 g_{22}}{I_0}$$

where:
- $P_2$ is the allocated transmission power for UE2;
- $g_{22}$ is the estimated path gain from UE2 to the second base station; and
- $I_o$ is background noise and other interference.

8. The method as recited in claim 7, wherein the step of calculating the difference (ΔSINR) between the first and second uplink SINR levels for UE2 includes calculating the ΔSINR such that:

$$\Delta SINR_{12} = 10\log(SINR_0) - 10\log(SINR) = 10\log\left(1 + \frac{P_1 g_{12}}{I_0}\right).$$

9. The method as recited in claim 8, wherein the interference analysis tool is implemented in the second base station, and the method further comprises the steps of:
receiving by the second base station from the first base station, information for dynamically estimating ΔSINR by the interference analysis tool, wherein the information includes either the interfering power $P_1 g_{12}$ of UE 1 as calculated by the first base station, or $P_1$ and $g_{12}$ separately so that the second base station can calculate $P_1 g_{12}$; and
dynamically estimating ΔSINR by the interference analysis tool in the second base station.

10. The method as recited in claim 1, wherein the interference analysis tool is implemented or located in a centralized unit in the cellular radio network, and the method further comprises the steps of:
determining by the interference analysis tool, whether the Δ-measure for UE2 exceeds a predefined threshold; and
sending an indication from the interference analysis tool to base stations in the cellular radio network indicating that the Δ-measure for UE2 exceeds the predefined threshold.

11. A method in a cellular radio network in which at least a first User Equipment (UE1) and a second User Equipment (UE2) are operating, wherein UE1 is in a first cell (Cell1) served by a first base station and UE2 is in a second cell (Cell2) served by a second base station, wherein the method determines a level of severity of interference to UE2 originating in Cell1, wherein the interference to UE2 originating in Cell1 is uplink interference caused by uplink transmissions from UE1, the method comprising the steps of:
determining by an interference analysis tool, a first signal quality level experienced by UE2, wherein the first signal quality level includes the interference originating in Cell1, wherein determining the first signal quality level includes determining a first uplink Signal-to-Interference-and-Noise-Ratio level (SINR) experienced by UE2, wherein the first uplink SINR level includes uplink interference from UE1;
determining by the interference analysis tool, a second signal quality level experienced by UE2, wherein the second signal quality level does not include the interference originating in Cell1, wherein determining the second signal quality level includes determining a second uplink SINR level ($SINR_0$) experienced by UE2, wherein the second uplink SINR level ($SINR_0$) does not include the uplink interference from UE1;
calculating by the interference analysis tool, a difference (Δ-measure) between the first and second signal quality levels for UE2, wherein the Δ-measure is a difference (ΔSINR) between the first and second uplink SINR levels for UE2 indicating the level of severity of interference to UE2 originating in Cell1;
receiving by the interference analysis tool, signal quality measurements from a plurality of UEs operating throughout the cellular radio network, each of the signal quality measurements identifying a location and a corresponding serving cell;
calculating by the interference analysis tool, a ΔSINR value for each of the plurality of UEs; and
plotting the ΔSINR values on a network cell map shaded to show the value of ΔSINR at different locations throughout the network.

12. A method in a cellular radio network in which at least a first User Equipment (UE1) and a second User Equipment (UE2) are operating, wherein UE1 is in a first cell (Cell1) served by a first base station and UE2 is in a second cell (Cell2) served by a second base station, wherein the method determines a level of severity of interference to UE2 originating in Cell1, wherein the interference to UE2 originating in Cell1 is downlink interference caused by downlink transmissions from the first base station, the method comprising the steps of:

determining by an interference analysis tool, a first signal quality level experienced by UE2, wherein the first signal quality level includes the interference originating in Cell1, wherein determining the first signal quality level includes determining a first downlink Signal-to-Interference-and-Noise-Ratio level (SINR) experienced by UE2, wherein the first downlink SINR level includes downlink interference from the first base station;

determining by the interference analysis tool, a second signal quality level experienced by UE2, wherein the second signal quality level does not include the interference originating in Cell1, wherein determining the second signal quality level includes determining a second downlink SINR level (SINR$_0$) experienced by UE2, wherein the second downlink SINR level (SINR$_0$) does not include the downlink interference from the first base station; and calculating by the interference analysis tool, a difference (Δ-measure) between the first and second signal quality levels for UE2, wherein the Δ-measure is a difference (ΔSINR) between the first and second downlink SINR levels for UE2 indicating the level of severity of interference to UE2 originating in Cell1;

wherein the step of determining the first downlink SINR level experienced by UE2 includes calculating the first downlink SINR level such that:

$$SINR = \frac{P_2 g_{22}}{P_1 g_{21} + I_0}$$

where:
P$_2$ is an allocated transmission power for the second base station;
g$_{22}$ is an estimated path gain from the second base station to UE2;
P$_1$ is an allocated transmission power for the first base station;
g$_{21}$ is an estimated path gain from the first base station to UE2; and
I$_0$ is background noise and other interference.

13. The method as recited in claim 12, wherein the step of determining the second downlink SINR level (SINR$_0$) experienced by UE2 includes calculating the second downlink SINR level (SINR$_0$) such that:

$$SINR_0 = \frac{P_2 g_{22}}{I_0}$$

where:
P$_2$ is the allocated transmission power for the second base station;
g$_{22}$ is the estimated path gain from the second base station to UE2; and
I$_0$ is background noise and other interference.

14. The method as recited in claim 13, wherein the step of calculating the difference (ΔSINR) between the first and second downlink SINR levels for UE2 includes calculating the ΔSINR such that:

$$\Delta SINR = 10\log(SINR_0) - 10\log(SINR) = 10\log\left(1 + \frac{P_1 g_{21}}{I_0}\right).$$

15. The method as recited in claim 14, wherein the interference analysis tool is implemented in the second base station, and the method further comprises the steps of:
receiving by the second base station from the first base station, the allocated transmission power for the first base station (P$_1$); and
dynamically estimating ΔSINR by the interference analysis tool in the second base station.

16. An interference analysis tool for determining a level of severity of interference to a second User Equipment (UE2) in a cellular radio network, wherein a first User Equipment (UE1) is operating in a first cell (Cell1) served by a first base station, and UE2 is operating in a second cell (Cell2) served by a second base station, and the interference to UE2 originates in Cell1, wherein the interference to UE2 originating in Cell1 is uplink interference caused by uplink transmissions from UE1, the interference analysis tool comprising:
a processor; and
a non-transitory memory connected to the processor for storing computer program instructions, wherein when the processor executes the computer program instructions, the processor causes the interference analysis tool to:
determine a first Signal-to-Interference-and-Noise-Ratio level (SINR) experienced by UE2, wherein the first SINR level is a first uplink SINR level that includes the uplink interference from UE1;
determine a second SINR level (SINR$_0$) experienced by UE2, wherein the second SINR level (SINR$_0$) is a second uplink SINR level that does not include the uplink interference from UE1; and
calculate a difference (ΔSINR) between the first and second SINR levels for UE2, wherein the ΔSINR indicates the level of severity of interference to UE2 originating in Cell1;
wherein the interference analysis tool is configured to determine the first uplink SINR level experienced by UE2 such that:

$$SINR = \frac{P_2 g_{22}}{P_1 g_{12} + I_0}$$

where:
P$_2$ is an allocated transmission power for UE2;
g$_{22}$ is an estimated path gain from UE2 to the second base station;
P$_1$ is an allocated transmission power for UE1;
g$_{12}$ is an estimated path gain from UE1 to the second base station; and
I$_0$ is background noise and other interference.

17. The interference analysis tool as recited in claim 16, wherein the interference analysis tool is configured to identify an area of Cell 2 where UE2 is operating as an interference-problem area when the ΔSINR of UE2 is greater than a threshold value.

18. The interference analysis tool as recited in claim 16, wherein the interference analysis tool is configured to identify an area of Cell 1 where UE1 is operating as an interference-causing area when the ΔSINR of UE2 is greater than a threshold value.

19. The interference analysis tool as recited in claim 18, wherein the interference analysis tool is configured to initiate Radio Resource Management (RRM) procedures to reduce the risk of interference problems for UE2 caused by UE1 when the ΔSINR of UE2 is greater than a threshold value.

20. The interference analysis tool as recited in claim 16, wherein the interference analysis tool is configured to determine the second uplink SINR level ($SINR_0$) experienced by UE2 such that:

$$SINR_0 = \frac{P_2 g_{22}}{I_0}$$

where:
P$_2$ is the allocated transmission power for UE2;
$g_{22}$ is the estimated path gain from UE2 to the second base station; and
$I_0$ is background noise and other interference.

21. The interference analysis tool as recited in claim 20, wherein the interference analysis tool is configured to determine the difference ($\Delta SINR$) between the first and second uplink SINR levels for UE2 such that:

$$\Delta SINR_{12} = 10\log(SINR_0) - 10\log(SINR) = 10\log\left(1 + \frac{P_1 g_{12}}{I_0}\right).$$

22. The interference analysis tool as recited in claim 16, wherein the interference analysis tool is implemented or located in a centralized unit in the cellular radio network.

23. The interference analysis tool as recited in claim 16, wherein the interference analysis tool is implemented in the second base station, and the interference analysis tool is further configured to:
receive from the first base station, an allocated transmission power for UE1 ($P_1$) and a background noise and interference level in Cell 1 ($I_1$); and
dynamically estimate $\Delta SINR$ using $P_1$ and $I_1$.

24. An interference analysis tool for determining a level of severity of interference to a second User Equipment (UE2) in a cellular radio network, wherein a first User Equipment (UE1) is operating in a first cell (Cell1) served by a first base station, and UE2 is operating in a second cell (Cell2) served by a second base station, and the interference to UE2 originates in Cell1, wherein the interference to UE2 originating in Cell1 is downlink interference caused by downlink transmissions from the first base station, the interference analysis tool comprising:
a processor; and
a non-transitory memory connected to the processor for storing computer program instructions, wherein when the processor executes the computer program instructions, the processor causes the interference analysis tool to:
determine a first Signal-to-Interference-and-Noise-Ratio level (SINR) experienced by UE2, wherein the first SINR level is a first downlink SINR level that includes the downlink interference from the first base station;
determine a second SINR level ($SINR_0$) experienced by UE2, wherein the second SINR level ($SINR_0$) is a second downlink SINR level that does not include the downlink interference from the first base station; and
calculate a difference ($\Delta SINR$) between the first and second SINR levels for UE2, wherein the $\Delta SINR$ indicates the level of severity of interference to UE2 originating in Cell1;
wherein the interference analysis tool is configured to determine the first downlink SINR level experienced by UE2 such that:

$$SINR = \frac{P_2 g_{22}}{P_1 g_{21} + I_0}$$

where:
P$_2$ is an allocated transmission power for the second base station;
$g_{22}$ is an estimated path gain from the second base station to UE2;
P$_1$ is an allocated transmission power for the first base station;
$g_{12}$ is an estimated path gain from the second base station to UE1; and
$I_0$ is background noise and other interference.

25. The interference analysis tool as recited in claim 24, wherein the interference analysis tool is configured to determine the second downlink $SINR_0$ level experienced by UE2 such that:

$$SINR_0 = \frac{P_2 g_{22}}{I_0}$$

where:
P$_2$ is the allocated transmission power for the second base station;
$g_{22}$ is the estimated path gain from the second base station to UE2; and
$I_0$ is background noise and other interference.

26. The interference analysis tool as recited in claim 25, wherein the interference analysis tool is configured to calculate the difference ($\Delta SINR$) between the first and second downlink SINR levels for UE2 such that:

$$\Delta SINR = 10\log(SINR_0) - 10\log(SINR) = 10\log\left(1 + \frac{P_1 g_{21}}{I_0}\right).$$

27. The interference analysis tool as recited in claim 26, wherein the interference analysis tool is implemented in the second base station, and the interference analysis tool is further configured to:
receive from the first base station, the allocated transmission power for the first base station ($P_1$) and the background noise and interference level in Cell 1 ($I_1$); and
dynamically estimate $\Delta SINR$ using $P_1$ and $I_1$.

28. The interference analysis tool as recited in claim 16, wherein the interference analysis tool is implemented or located in a centralized unit in the cellular radio network, and the method further comprises the steps of:
determining by the interference analysis tool, whether the $\Delta SINR$ for UE2 exceeds a predefined threshold; and
sending an indication from the interference analysis tool to base stations in the cellular radio network indicating that the $\Delta SINR$ for UE2 exceeds the predefined threshold.

* * * * *

UNITED STATES PATENT AND TRADEMARK OFFICE
CERTIFICATE OF CORRECTION

PATENT NO. : 8,725,079 B2
APPLICATION NO. : 13/231582
DATED : May 13, 2014
INVENTOR(S) : Wang Helmersson et al.

Page 1 of 1

It is certified that error appears in the above-identified patent and that said Letters Patent is hereby corrected as shown below:

IN THE SPECIFICATION:

In Column 11, Line 6, delete "$\Delta\Delta SINR$" and insert -- $\Delta SINR$ --, therefor.

IN THE CLAIMS:

In Column 20, Line 17, in Claim 24, delete "$g_{12}$" and insert -- $g_{21}$ --, therefor.

Signed and Sealed this
Eighteenth Day of November, 2014

Michelle K. Lee
*Deputy Director of the United States Patent and Trademark Office*